United States Patent [19]
Coates

[11] Patent Number: 6,155,205
[45] Date of Patent: Dec. 5, 2000

[54] BIRD FEEDER

[76] Inventor: Carl Coates, 1 Coates Dr., Corydon, Iowa 50060

[21] Appl. No.: 09/248,943

[22] Filed: Feb. 12, 1999

[51] Int. Cl.$^7$ .................................................. A01K 39/01
[52] U.S. Cl. ........................................ 119/57.9; 119/52.3
[58] Field of Search ................... 119/57.9, 57.8, 119/52.1, 52.2, 52.3; 30/124, 128

[56] References Cited

U.S. PATENT DOCUMENTS

| | | |
|---|---|---|
| 2,475,207 | 7/1949 | Smith . |
| 2,856,898 | 10/1958 | Doubleday et al. . |
| 3,090,354 | 5/1963 | Merritt et al. . |
| 4,030,451 | 6/1977 | Miller ...................................... 119/57.9 |
| 4,102,308 | 7/1978 | Kilham .................................. 119/52 R |
| 4,144,842 | 3/1979 | Schlising ................................ 119/52.3 |
| 5,086,730 | 2/1992 | Figley .................................... 119/52.3 |
| 5,095,847 | 3/1992 | Coffer .................................... 119/52.2 |
| 5,775,257 | 7/1998 | Park ...................................... 119/57.8 |

Primary Examiner—Peter M. Poon
Assistant Examiner—Yvonne R. Abbott
Attorney, Agent, or Firm—Zarley, McKee, Thomte, Voorhees & Sease

[57] ABSTRACT

A bird feeder has a vertical feed container with a top, an open bottom, and a continuous sidewall. A feed tray is positioned below the open bottom in spaced relation thereto and extends outwardly from the sidewall. The feed tray has an open top and an open perimeter edge. A perch is mounted on the tray and is located below the upper perimeter edge. A transparent hood element is mounted on and extends around the feed container. It has a lower edge which is positioned below the upper perimeter edge of the tray and above the perch. This permits the perch to dwell below the hood in the clear visibility of the birds which will attract the birds to fly within the hood, locate themselves on the perch, and feed themselves from the tray. The perch has a diameter less than the lower diameter of the hood to provide a space between the outer perimeter of the perch and the outer perimeter of the lower edge of the hood for the birds to move through to land on the perch.

9 Claims, 5 Drawing Sheets

BIRD FEEDER

BACKGROUND OF THE INVENTION

Among the common deficiencies of bird feeders are that they are difficult to fill with feed; the birds waste considerable feed while feeding; and the wind often blows some feed out of the feeder. Efforts to correct these shortcomings, including efforts to also keep the feed dry, result in inhibiting the birds from using the feeder.

It is, therefore, a principal object of this invention to provide a bird feeder that will attract birds, and that will be easy to fill with feed and will tend to avoid wastage of feed either by the birds or by the wind.

These and other objects will be apparent to those skilled in the art.

SUMMARY OF THE INVENTION

A bird feeder has a vertical feed container with a top, an open bottom, and a continuous sidewall. A feed tray is positioned below the open bottom in spaced relation thereto and extends outwardly from the sidewall. The feed tray has an open top and an open perimeter edge.

A perch is mounted on the tray and is located below the upper perimeter edge. A transparent hood element is mounted on and extends around the feed container. It has a lower edge which is positioned below the upper perimeter edge of the tray and above the perch. This permits the perch to dwell below the hood in the clear visibility of the birds which will attract the birds to fly within the hood, position themselves on the perch, and feed themselves from the tray. The perch has a diameter less than the lower diameter of the hood to provide a space between the outer perimeter of the perch and the outer perimeter of the lower edge of the hood for the birds to move through to land on the perch.

DESCRIPTION OF THE PREFERRED EMBODIMENT

Figure 2:
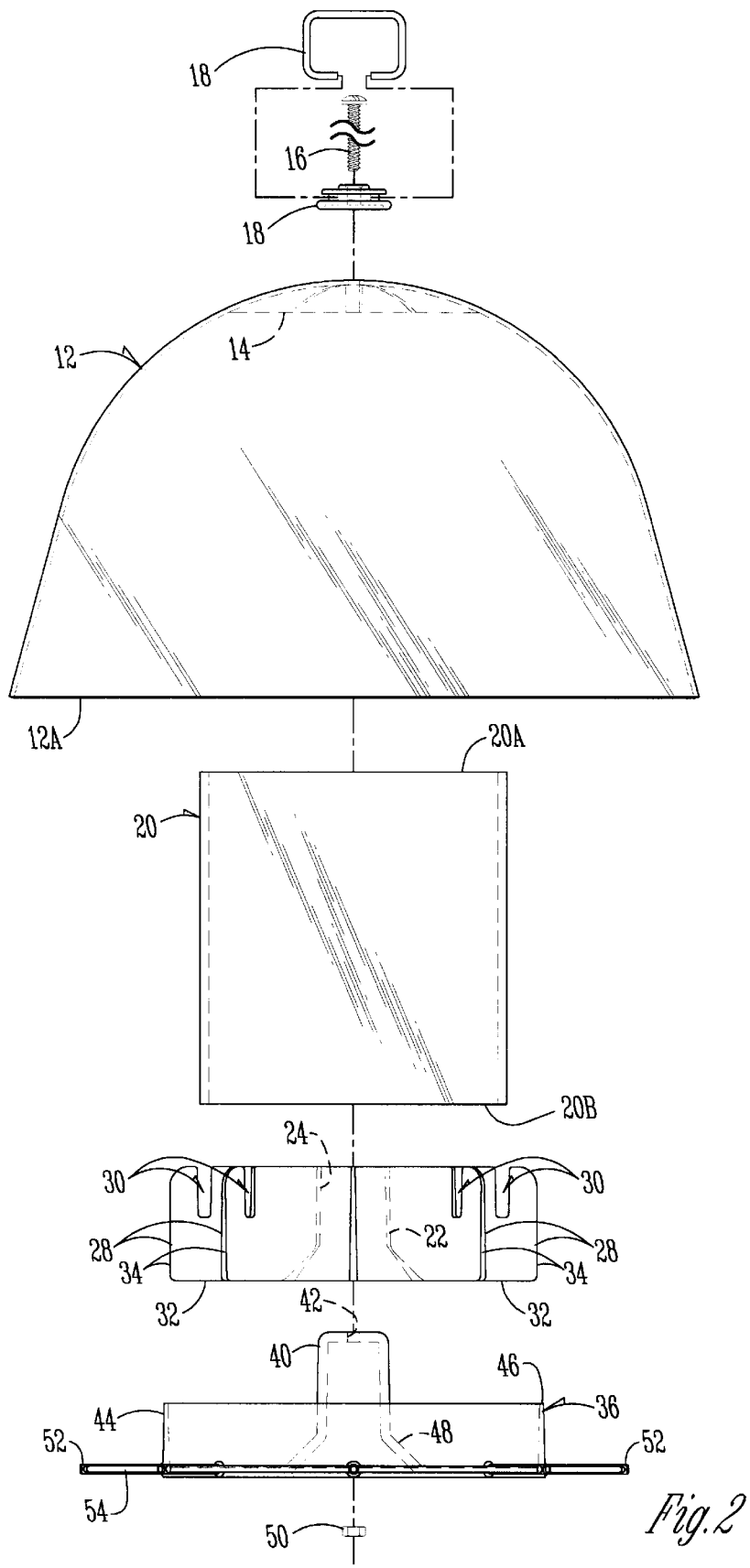
FIG. 2 is a reduced scale exploded view of the components of the bird feeder of FIG. 1.
Figure 3:
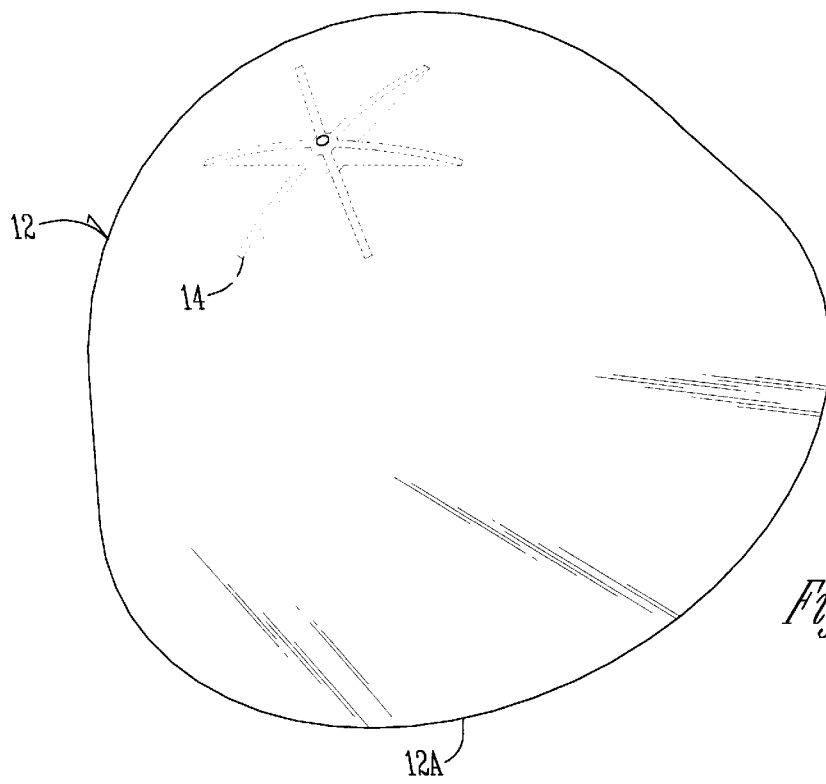
FIG. 3 is a top perspective view of the hover.

The bird feeder 10 has an inverted bowl-shaped transparent hood 12. Hood 12 has lower edge 12A (FIG. 2) and a reinforcing bearing 14. Threaded bolt 16 extends through hanger 18 with bolt 16 being threadably affixed within the center of reinforcing bearing 14.

Figure 1:
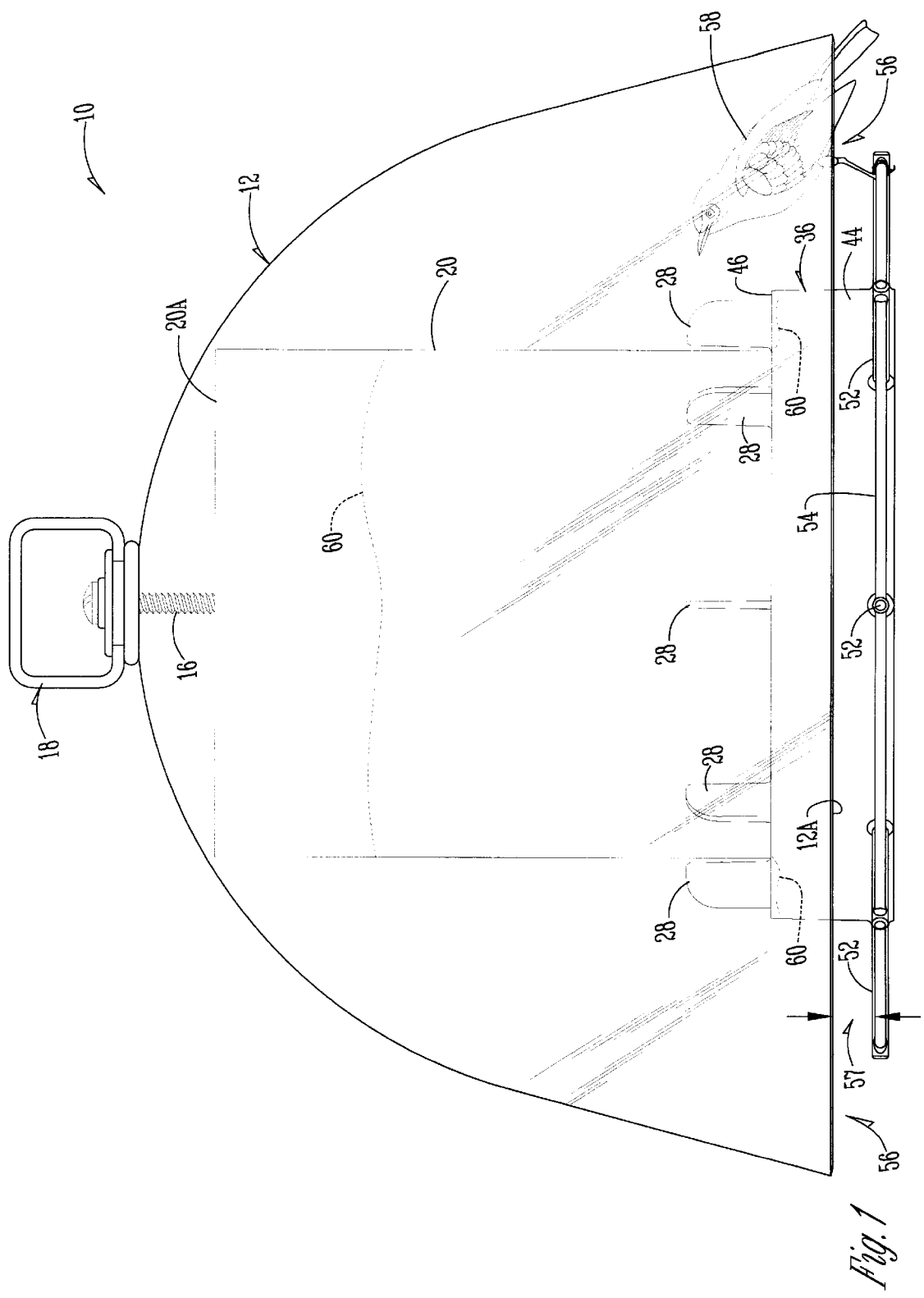
FIG. 1 is a side elevational view of the bird feeder of this invention.
Figure 1A:
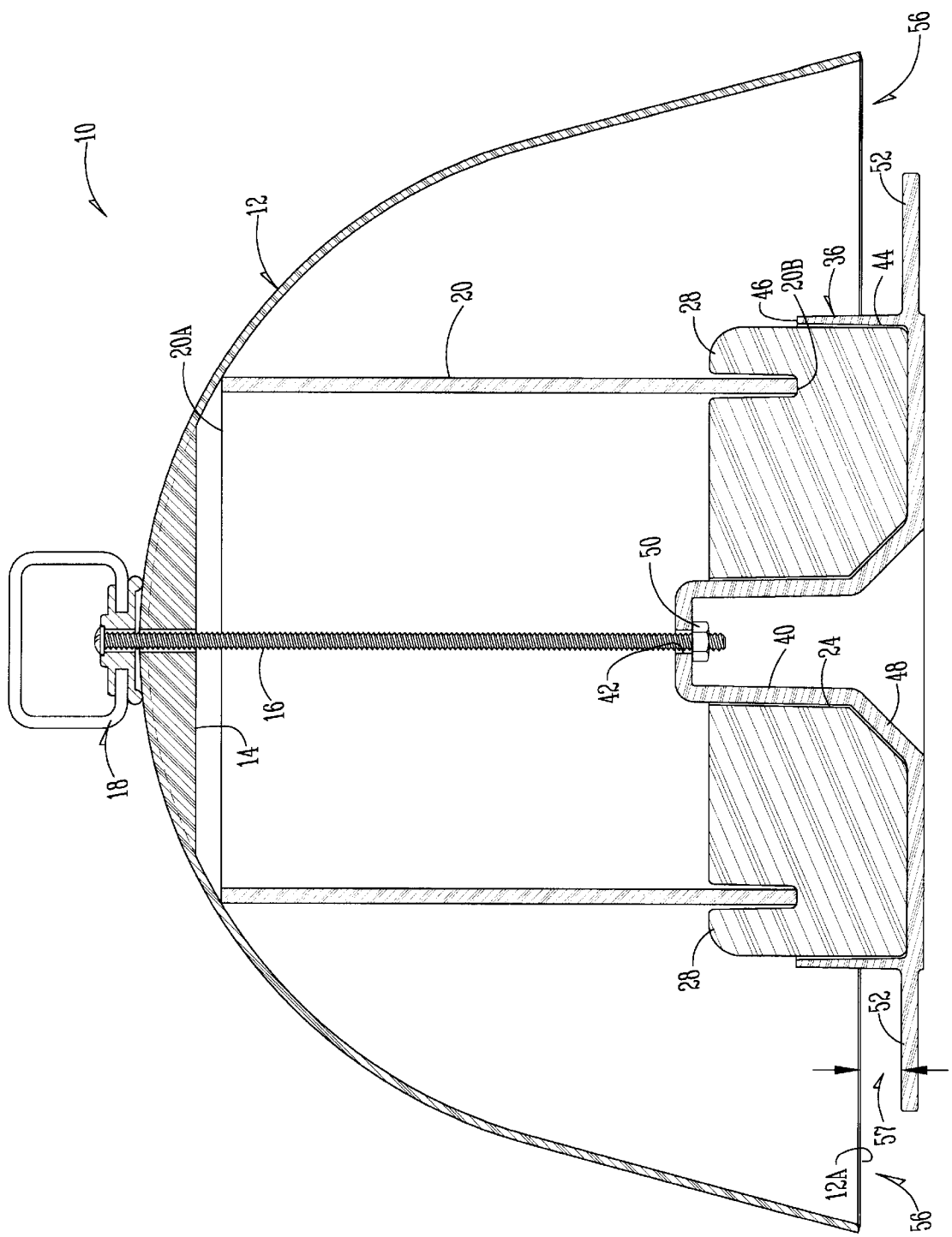
FIG. 1A is a vertical cross-sectional view of the feeder as shown in FIG. 1.

The numeral 20 designates an open ended cylindrical feed compartment with an upper edge 20A and a lower edge 20B. The upper edge 20A engages and supports the hood 12 as best seen in FIGS. 1 and 1A. The feed compartment 20 is preferably made of transparent material.

Figure 4:
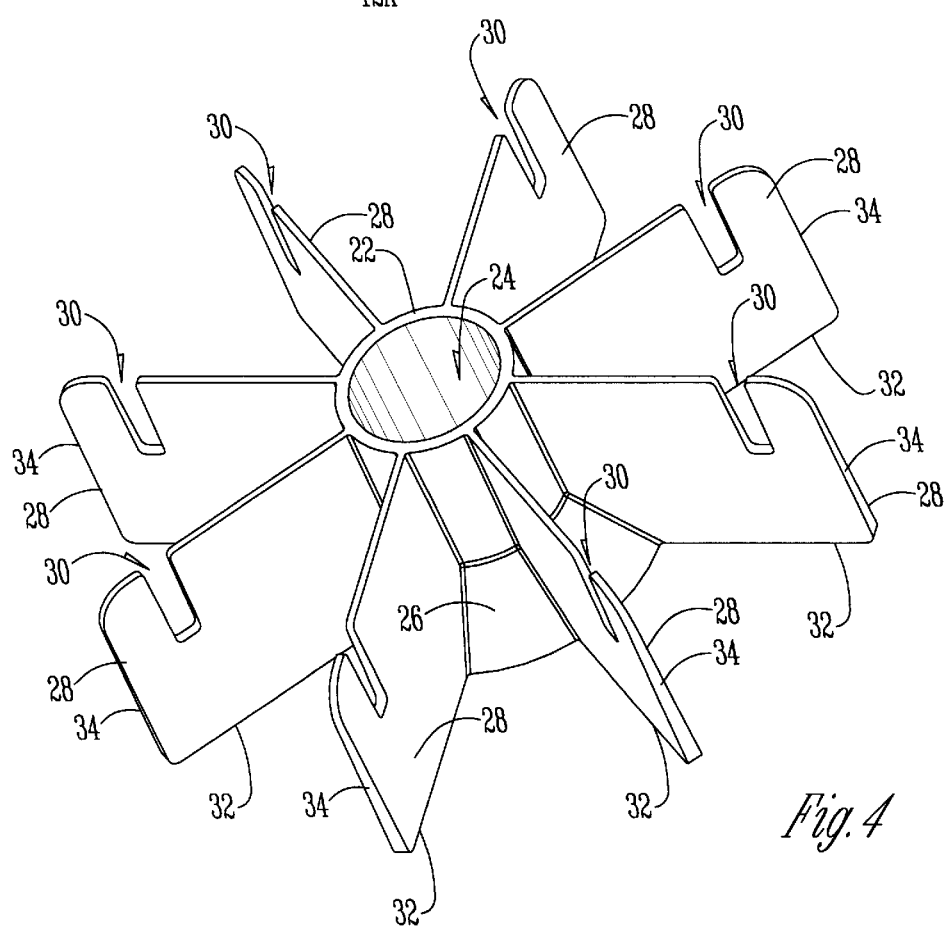
FIG. 4 is a top perspective view of the spindle which dwells inside the feed tray or feed pan.

A hollow center hub 22 (FIG. 4) has a center bore 24, and a tapered lower portion 26. A plurality of windshield dividers 28 extend radially outwardly from hub 22 and each has a vertical notch 30 extending downwardly from the upper edges thereof; a lower edge 32, and outer ends 34. Notches 30 are spaced so as to receive the lower edge 20B of feed compartment 20. The hub 22 has a tapered portion 26 around its lower end.

Figure 5:
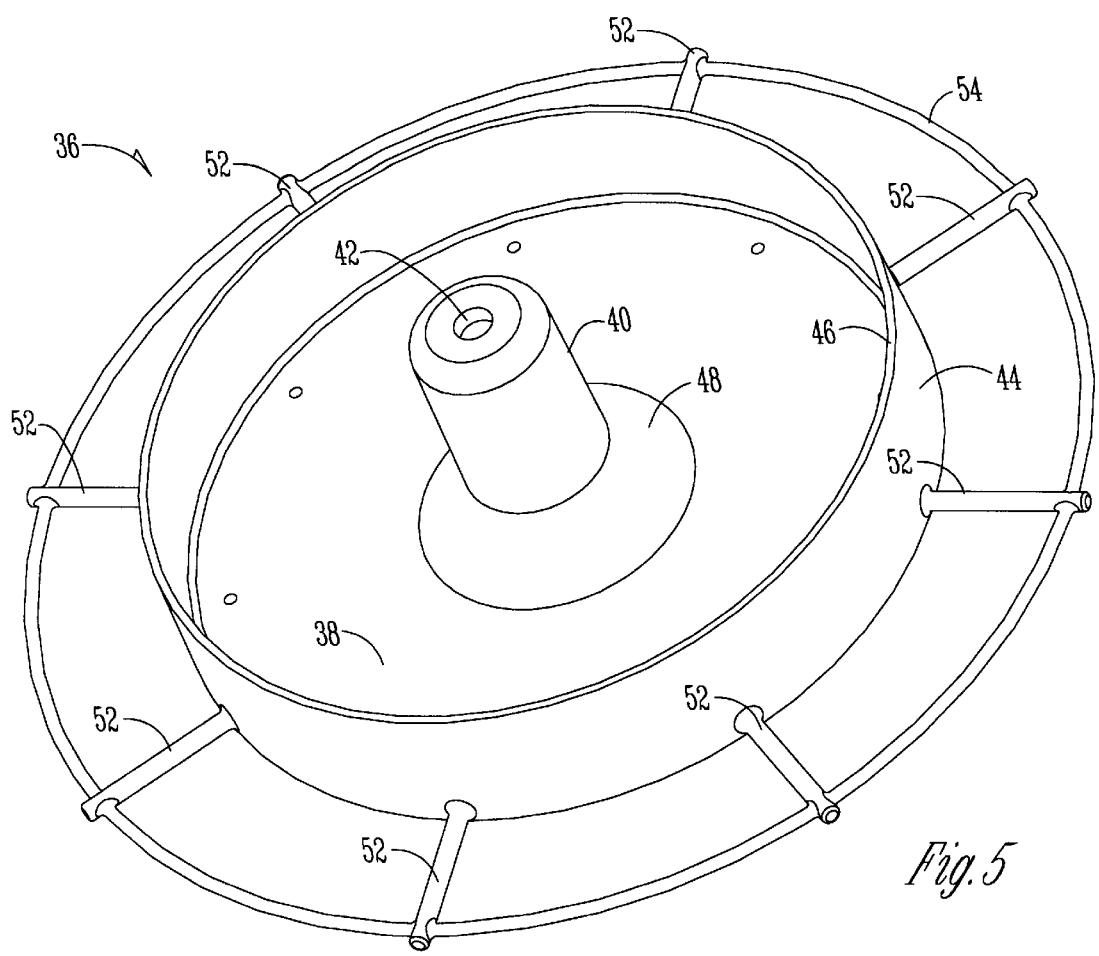
FIG. 5 is a perspective view of the feed tray with the perch mounted thereon.

The feed pan 36 is best shown in FIG. 5. Pan 36 has a bottom 38, and a hollow center post 40 which is compatible in shape to the center hub 22. Post 40 has a center opening 42. The hollow center hub 22 is adapted to fit downwardly over the center post 40 of feed pan 36. The outer ends 34 of the radially extending windshield dividers 28 are encircled by a vertical cylindrical wall 44 with top edge 46. The numeral 48 designates a tapered portion at the lower end of post 40 which is compatible in shape to the tapered portion 26 on the lower end of hub 22. A nut 50 is located within post 40 below opening 42.

A plurality of radial arms 52 are secured to bottom 46 of pan 36 and extend outwardly in a horizontal direction from the wall 44. A circular bird perch 54 is secured to the outer ends of arms 52 as best shown in FIG. 5.

With reference to FIG. 1, it is seen that the lower edge 12A of hood 12 has a diameter greater than that of perch 54 so that an open space 56 exists between the outer lower perimeter of the hood and the outer perimeter of perch 54.

It is important that the perch 54 be spaced in the order of one-half inch below the lower edge 12A of the hood. This is accomplished by the relative vertical dimensions of the center hub 22; the depth of feed pan 36; and the vertical height of feed compartment 20. As best shown in FIG. 1A, the lower edge 20B of feeder compartment 20 dwells in the bottom of notches 30 of dividers 28. The lower edges 32 of dividers 28 rest on the bottom 46 of pan 36.

As previously indicated, the center post 40 is hollow and has its center opening 42 therein. The lower end of bolt 16 extends through the opening 42 and is threadably received by nut 50. The tightening of bolt 12 in the nut 50 pulls the feeder pan and the divider walls up tightly against the lower edge 20B of the compartment 20 and maintains the space 57 shown in FIG. 1. Again, this dimension is very important because it enables the birds 58 to see the perch 54 which will induce them to fly through the space 56 and land on the perch because they are able to see the perch before attempting to fly into the hood 12. If the perch 54 were located upwardly within the confines of hood 12, very few, if any, of birds 58 would fly onto the perch if so positioned.

The hub 22 is slidably fit over post 40. The compatible tapered portion 26 on hub 18 fits down over tapered portion 48 of post 40. The lower edges 20B of dividers 20 rest on the bottom 46 of pan 36.

This invention will adequately protect the feed 60 from inclement weather and will permit the birds 58 to fly into the hood 12 and easily rest on the perch 54. The feed 60 in feeder 20 can be replenished by loosening the bolt 16 and removing the hood 12. The dividers 28 will tend to protect the movement of feed within the pan 36 even if cross winds do take place within the lower portion of the interior of the hood.

The feeder 10 is assembled or disassembled in the manner described through the action of bolt 16. This permits the compartment 20 to be easily filled with feed 60, and also facilitates cleaning of the feeder when required.

It is therefore seen that this invention will achieve all the stated objectives.

What is claimed is:

1. A bird feeder comprising, a vertical feed container having a top, an open bottom, and a sidewall with upper and lower edges, a feed tray positioned below the open bottom in spaced relation thereto and extending outwardly from the sidewall, the feed tray having an open top and an upper perimeter edge, a perch on the feed tray located below the upper perimeter edge, a hood element on and extending around the feed container, and having a horizontal lower edge below the upper perimeter edge of the feed tray and above the perch, the perch having a maximum horizontal dimension less than that of the lower edge of the hood element to provide a space between an outer perimeter of the perch and an outer perimeter of the lower edge of the hood element which will permit birds to fly within the hood element, position themselves on the perch, and to feed themselves from the feed tray.

2. The device of claim 1 wherein radially extending walls divide the tray into separate compartments.

3. The device of claim 2 wherein the lower portion of the feed container fits into slots of the radially extending walls.

4. The device of claim 2 wherein the radially extending walls have bottom edges engaging the bottom of the feed tray.

5. The device of claim 1 wherein the perch is located outwardly of the feed tray, and the lower edge of the hood element is located outwardly from the perch.

6. The device of claim 1 wherein the perch is located outwardly of the feed tray, and the lower edge of the hood element is located outwardly and upwardly from the perch.

7. The device of claim 1 wherein the feed container and the hood are comprised of transparent material.

8. A bird feeder comprising, a vertical feed container having a top, an open bottom, and a sidewall with upper and lower edges, a feed tray positioned below the open bottom in spaced relation thereto and extending outwardly from the sidewall, the feed tray having an open top and an upper perimeter edge, a perch on the feed tray located below the upper perimeter edge, a hood element on and extending around the feed container, and having a lower edge below the upper perimeter edge of the feed tray and above the perch, the perch being located outwardly of the feed tray, and the lower edge of the hood element is located outwardly from the perch.

9. A bird feeder comprising, a vertical feed container having a top, an open bottom, and a sidewall with upper and lower edges, a feed tray positioned below the open bottom in spaced relation thereto and extending outwardly from the sidewall, the feed tray having an open top and an upper perimeter edge, a perch on the feed tray located below the upper perimeter edge, a hood element on and extending around the feed container, and having a lower edge below the upper perimeter edge of the feed tray and above the perch, the perch is located outwardly of the feed tray, and the lower edge of the hood element is located outwardly and downwardly from the perch.

* * * * *